United States Patent [19]
Fisher

[11] 3,785,567
[45] Jan. 15, 1974

[54] MOVABLE WALL FOR ENGINE NOZZLE

[75] Inventor: John M. Fisher, Cuyahoga Falls, Ohio

[73] Assignee: The B. F. Goodrich Company, New York, N.Y.

[22] Filed: Nov. 2, 1972

[21] Appl. No.: 303,271

[52] U.S. Cl............ 239/265.39, 92/48, 239/265.43
[51] Int. Cl............................................ B64c 15/06
[58] Field of Search................ 239/265.33, 265.37, 239/265.39, 265.41, 265.43; 181/33 HD; 138/44–46; 92/48

[56] References Cited
UNITED STATES PATENTS
3,637,140   1/1972   Palovchik ............... 239/265.43
3,643,868   2/1972   McMurtry .............. 239/265.39

*Primary Examiner*—M. Henson Wood, Jr.
*Assistant Examiner*—Michael Y. Mar
*Attorney*—John D. Haney

[57] ABSTRACT

A movable wall having a plurality of side-by-side wall members connected by a web of resilient rubberlike material and swingable about different axes tangent to a ring around an engine nozzle area. A first inflatable tube is in engagement with one side of the wall members and a second inflatable tube is in engagement with the other side of the wall members for selectively swinging the wall members toward or away from the nozzle area as the fluid pressure is increased in one inflatable tube and decreased in the other.

15 Claims, 6 Drawing Figures

PATENTED JAN 15 1974 3,785,567
SHEET 1 OF 2
Fig. 1
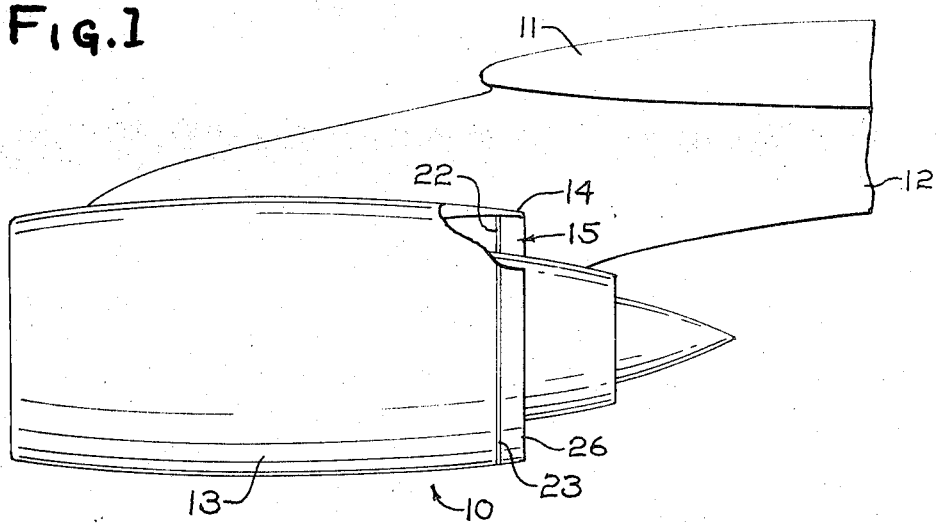
Fig. 2
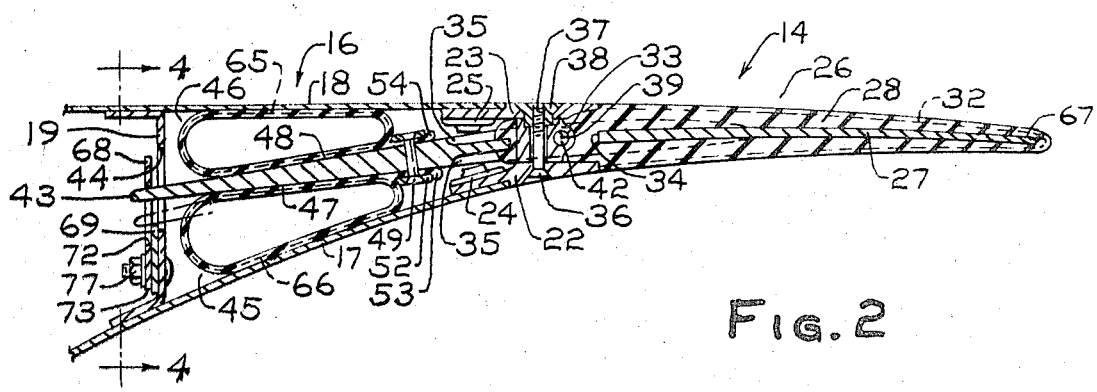
Fig. 3

MOVABLE WALL FOR ENGINE NOZZLE

BACKGROUND OF THE INVENTION

This invention relates to a fan nozzle for a so-called "fan jet" aircraft engine. Normally the fan nozzle area is fixed to provide the air flow required for maximum efficiency during the cruise condition of the aircraft. With this design, the fan nozzle area is undersize for the aircraft during take-off when the engine requires an increased air mass flow and the maximum thrust available cannot be obtained because of the fixed area fan nozzle.

The space requirements and the low operating temperatures of the air passing through the fan nozzle have made it difficult to provide a variable area engine nozzle especially since one of the requirements of a variable nozzle is that it have a streamlined shape that will not generate any air turbulence. The diameter of the nozzle is not the same at all circumferential positions and it is not desirable that it be opened or closed the same amount at all positions around the nozzle. For example, in one application, part of the nozzle must be capable of expanding to a take-off diameter of 91.4 inches and contracting to a cruise mode diameter of 89.3 inches at one point in the nozzle. At other points circumferentially spaced from this part of the nozzle, the expansion and contraction required may be greater or smaller.

It is also desirable that the power for actuating the variable area nozzle utilize the fluid pressure from the engine such as the air bled from the engine which introduces another problem since this engine-bleed air has a high temperature. It is also desirable that the adjustment to the engine nozzle be made quickly in not more than three seconds to meet the requirements of aircraft operation.

SUMMARY OF THE INVENTION

The variable area fan nozzle of this invention provides a nozzle edge of resilient rubberlike material having the desired aerodynamic shape and which is movable radially inward and outward by a plurality of axially extending wall members embedded in the resilient rubberlike material and pivotally mounted to the engine nacelle. The ends of the wall members extend into the wall of the engine nacelle and have inflatable actuator tubes positioned on both the top and bottom sides. By selectively inflating one or the other of the inflatable tubes with engine-bleed air, the diameter of the nozzle can be changed. The amount of swinging movement of the nozzle wall radially inward and radially outward is controlled by adjustable stops engaging the ends of the wall members to limit the swinging movement thereof. The ends of the inflation tubes are connected to air supply lines at positions within the engine nacelle or strut where there is space for the inflation fittings and air supply lines connected to the engine.

The accompanying drawings show one preferred form of a variable area engine nozzle wall assembly and a movable wall assembly made in accordance with and embodying this invention and which is representative of how this invention may be practiced.

BRIEF DESCRIPTION OF THE DRAWINGS

In the drawings:

FIG. 1 is an elevation of a fan jet engine mounted on the wing of an aircraft with part of the engine nacelle broken away at the fan nozzle.

FIG. 2 is an enlarged sectional view of the nozzle mechanism at the fan nozzle portion shown in FIG. 1.

FIG. 3 is a fragmentary plan view of the wall member shown in FIG. 1 with parts being broken away.

DETAILED DESCRIPTION

Figure 4:
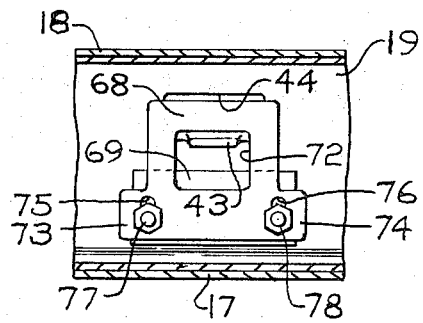
FIG. 4 is a fragmentary sectional view of the adjustable stops taken along the plane of line 4—4 of FIG. 2.

An aircraft engine 10 of the "fan jet" type is shown in FIG. 1 mounted on a wing 11 by a strut 12. The engine 10 has a nacelle 13 including a fan nozzle assembly 14 surrounding the engine fan duct 15.

As shown more clearly in FIG. 2, the fan nozzle assembly 14 includes a tubular supporting structure 16 of the nacelle having an inner lining member 17 and an outer lining member 18 which may be of aluminum sheet material connected by reinforcing bulkheads 19 and fastened to a metal inner ring 22 and a metal outer ring 23 at the edges of the lining members. Nut plates 24 and 25 are provided for receiving bolts (not shown) extending through the rings 22 and 23 and lining members 17 and 18 at the edges of the lining members.

A movable wall assembly 26, shown in FIGS. 2 and 3, has a plurality of wall members or fingers 27 embedded in a molded body or cover 28 of resilient rubberlike material which in the preferred construction shown is of silicone rubber capable of withstanding low operating temperatures and resisting the effects of oil and fuel from the engine. The cover 28 may be molded in a streamlined shape with a web 29 between adjacent fingers providing a continuous surface around the duct 15. Preferably a reinforcing member of fabric 32 is molded in the cover 28 near the surface and may be of a tricot type weave to permit stretching of the cover during operation.

Each of the fingers 27 has a pivotal connection approximately midway between the ends of the finger for swinging movement relative to the supporting structure 16. In the construction shown in FIG. 2 and FIG. 3, the pivotal connection includes a pivot block 33 extending through an opening 34 in the fingers 27 and embedded in the resilient rubberlike material of the cover 28 which overlaps the surfaces of the pivot block and the fingers. Each of the fingers 27 may have a groove 35 extending longitudinally of the finger on both sides of the opening 34 to provide clearance for the pivot block 33 and also for swinging movement without interference from the nut plates 24 and 25, as shown in FIG. 2. The pivot block 33 is mounted between the inner ring 22 and outer ring 23 by a screw 36 extending through an opening 37 in the pivot block and threaded on a sleeve 38 inset in the outer ring. The pivot block 33 also has a cylindrical hole 39 through which a pivot pin 42 may extend from the walls of the fingers 27 on both sides of the pivot block. The pivot block 33 and pivot pin 42 are preferably of materials which are self-lubricating to provide for pivotal movement of the wall assembly 26 with a minimum of force.

A first end 43 of each of the fingers 27 extends from the pivot block 33 and opening 34 between the inner lining member 17 and outer lining member 18 and through an opening 44 in the bulkhead 19. Inflatable members such as inner inflatable tube 45 and outer inflatable tube 46 are mounted on an inner actuating surface 47 and an outer actuating surface 48 of each of the fingers 27 by rivets 49 extending through the fingers and holding retaining plates 52 against flanges 53 and 54 of the inner inflatable tube and outer inflatable tube respectively.

Figure 5:
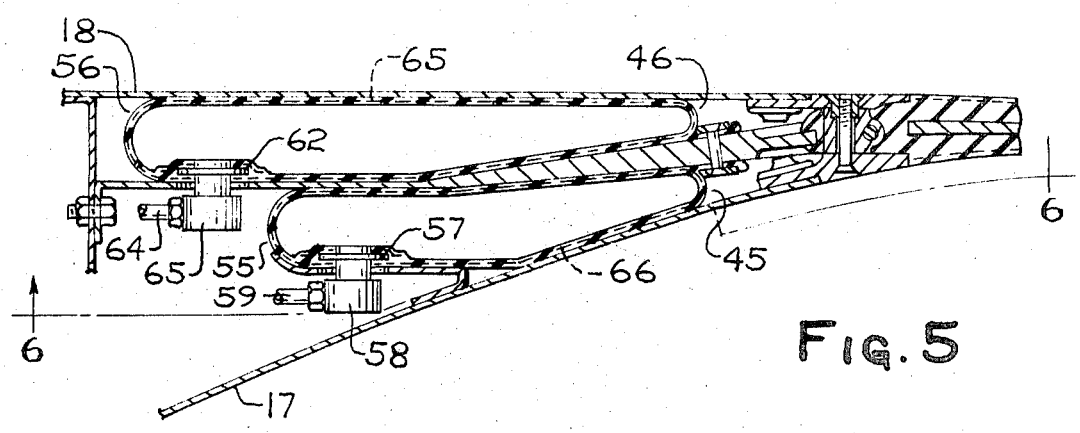
FIG. 5 is a sectional view like FIG. 2 at one end of the inflatable actuating tubes showing the inflation fittings connected to the fluid supply lines.
Figure 6:
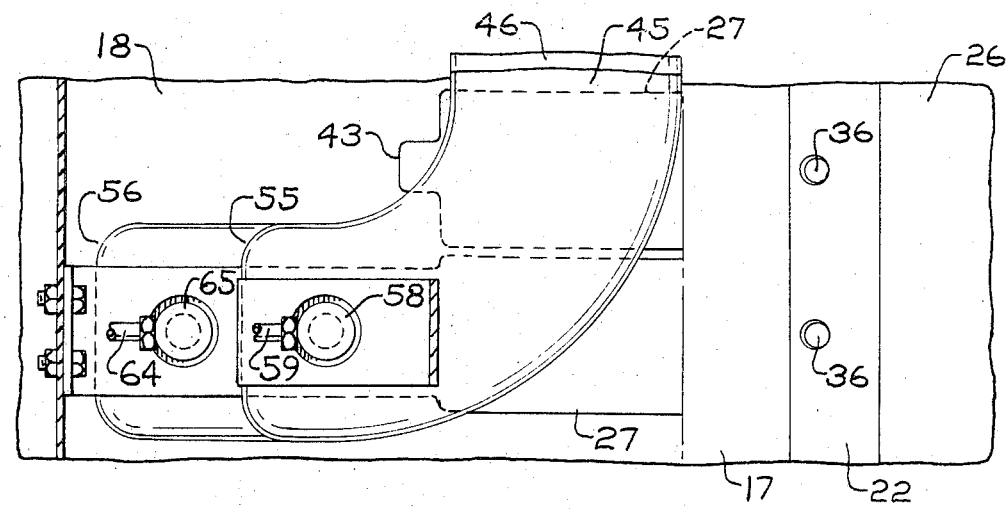
FIG. 6 is a fragmentary sectional view taken along the plane of line 6—6 of FIG. 5.

As shown in FIGS. 5 and 6, a closed end 55 of the inner inflatable tube 45 and a closed end 56 of the outer inflatable tube 46 extend through the bulkhead 19 into the space between the inner lining member 17 and outer lining member 18 at a position which may be in or adjacent the strut 12. The closed end 55 of the inner inflatable tube 45 has a flanged fitting 57 embedded in the surface of the inflatable tube for receiving a mating fitting 58 connectable to an air supply line 59. Likewise, the closed end 56 of the outer inflatable tube 46 has a flanged fitting 62 for receiving a mating fitting 63 which is connectable to an air supply line 64. The other ends of the inner inflatable tube 45 and outer inflatable tube 46 may be closed and the tubes may be of a resilient rubberlike material such as silicone rubber reinforced by a square-woven fabric 65 and 66 permitting expansion of the tubes and resisting high temperatures. The fabric 65 and 66 may be of a heat-resistance type such as Dacron, Nomex or other suitable material resistant to high temperatures.

The air supply lines 59 and 64 may be connected to a valve assembly (not shown) for directing engine-bleed air from the engine 10 selectively into the inner inflatable tube 45 or outer inflatable tube 46 and for selectively releasing the air from these tubes.

As shown in FIG. 2, the inner inflatable tube 45 and outer inflatable tube 46 engage the inner lining member 17 and outer lining member 18 in the inflated condition. It can be seen that if air is released from the inner inflatable 45 through air supply line 59 and air under pressure is injected into the outer inflatable tube 46 through air supply line 64, pressure will be applied against the outer actuating surface 48 of each of the fingers 27 and against the outer lining member 18 swinging the first end 43 of each of the fingers about the pivot pin 42 in a counterclockwise direction from the position shown in solid lines in FIG. 2 to the position shown in dot-dash lines. Simultaneously the other or second end 67 of each of the fingers 27 will swing in a counterclockwise direction and open the nozzle assembly 14 providing an increased area of the engine nozzle.

The movement of the wall assembly 26 is controlled by an outer stop member 68 and an inner stop member 69, shown in FIGS. 2 and 4. The outer stop member 68 has an opening 72 through which the first end 43 of each of the fingers 27 extends and has arms 73 and 74 containing slots 75 and 76 for receiving bolt and nut assemblies 77 and 78 for attachment fastened to the bulkhead 19. The inner stop member 69 is a plate interposed between the outer stop member 68 and the bulkhead 19 and has slots (not shown) similar to those of the outer stop member for receiving the bolt and nut assemblies 77 and 78. By loosening the bolt and nut assemblies 77 and 78 and moving the outer stop member 68 and inner stop member 69 to the desired positions and then tightening the bolt and nut assemblies, the swinging movement of the first end 43 of each of the fingers 27 can be limited and accordingly the position of the second end 67 of the wall assembly 26 can be controlled. In the embodiment shown, all of the fingers 27 except end finger 79 at the air supply lines 59 and 64 are swingable about the pivot pins 42 and each one of the swingable first ends 43 may be moved a predetermined amount by the inner inflatable tube 45 and outer inflatable tube 46 by adjusting the outer stop member 68 and inner stop member 69 for that wall member. In an engine of this type, it is usually desirable not to have the same movement of the nozzle wall at all points around the nacelle 13. It is also understood that the movable wall assembly 26 may not extend completely around the nacelle 13 and in the present embodiment, it is interrupted by the strut 12.

In the manufacture of the movable wall assembly 26 shown in FIG. 3, it may be molded in a flat shape with the cover 28 at the second end 67 having a dimension equal to the smallest circumferential length of the nozzle assembly 14. The shrinkage during the initial cure and the additional shrinkage during the post cure of this material further reduces the circumferential length in the installed condition. Therefore, when the wall assembly 26 is installed, the material of the cover 28 will be in tension and will provide a firm, stable surface maintaining a streamlined condition during operation.

With the construction described for the nozzle an increased and decreased area of the fan nozzle is obtainable which makes possible the maximum efficiency in the take-off and cruise condition of the aircraft.

While certain representative embodiments and details have been shown for the purpose of illustrating the invention, it will be apparent to those skilled in the art that various changes and modifications may be made therein without departing from the spirit or scope of the invention.

I claim:

1. A variable area passage comprising a wall member, a pivotal connection between said wall member and a supporting structure, said wall member having an actuating surface spaced from said pivotal connection, an inflatable member disposed between said actuating surface and said supporting structure and fluid pressure means to inflate said inflatable member into engagement with said supporting structure and said actuating surface to provide swinging movement of said wall member to vary the area of said passage.

2. A variable area passage according to claim 1 wherein said wall member has a first end and a second end with said pivotal connection located between said first end and said second end, said actuating surface being located between said pivotal connection and said first end whereby inflation of said inflatable member will cause swinging movement of said second end of said wall member located on the opposite side of said pivotal connection from said inflatable member.

3. A variable area passage according to claim 2 wherein said supporting structure contains stop means disposed for engagement by said first end of said wall member for limiting the swinging movement of said second end.

4. A variable area passage according to claim 3 wherein said stop means are located on opposite sides of said first end of said wall member and are adjustably mounted on said supporting structure at positions spaced from said first end of said wall member.

5. A variable area passage according to claim 1 wherein said actuating surface is disposed on one side of said wall member and a second actuating surface is located on the opposite side of said wall member a second inflatable member is disposed between said second actuating surface and said supporting structure for inflation by said fluid pressure means and valve means for controlling fluid pressure in the inflatable members to cause the wall member to swing in either direction about said pivotal connection to increase or decrease the area of said passage.

6. A variable area passage according to claim 2 wherein said second end of said wall member is covered by a body of resilient rubberlike material having a desired contour for said passage.

7. A variable area passage according to claim 6 wherein said pivotal connection is included in said body of resilient rubberlike material.

8. A variable area passage according to claim 6 wherein said body of resilient rubberlike material includes a reinforcing member of fabric material at the surface thereof.

9. A variable area passage according to claim 1 wherein said pivotal connection further comprises a pivot block mounted on said wall member for receiving a pivot pin fastened to said supporting structure.

10. A variable area passage comprising a plurality of wall members disposed in side-by-side relationship and connected by webs of resilient rubberlike material forming at least a portion of said passage, each of said wall members having a pivotal connection to a supporting structure whereby said wall members may rotate about different axes and increase or decrease the area of said passage.

11. A variable area passage according to claim 10 wherein each of said wall members has a first end and a second end and said pivotal connection is located between said first end and said second end, said webs of resilient rubberlike material being connected to each of said wall members between said second end and said pivotal connection, and each of said wall members having an actuating surface located between said first end and said pivotal connection for engagement by an actuating means to provide swinging movement of said wall members.

12. A variable area passage according to claim 11 wherein said webs of resilient rubberlike material cover said second end of each of said wall members and have a reinforcing member of stretchable fabric material at the surface thereof.

13. A variable area passage according to claim 11 wherein said pivotal connection further comprises a pivot block mounted on each of said wall members for receiving pivot pins fastened to said supporting structure.

14. An engine nozzle assembly comprising a tubular supporting structure having an outer lining member and an inner lining member, an outer ring fastened to the edge of said outer lining member and an inner ring fastened to the edge of said inner lining member, a plurality of wall members disposed in side-by-side relationship and connected by webs of resilient rubberlike material, said inner ring being radially spaced from said outer ring for receiving an enclosed end of each of said wall members, a pivotal connection between each of said wall members and said inner ring and said outer ring, inflatable members mounted on said enclosed end of each of said wall members, fluid pressure means for selectively inflating said inflatable members whereby the enclosed ends of said wall members are pushed away from said inner lining member and said outer lining member to swing the exposed ends of the wall members around the pivotal connections and vary the diameter of the nozzle.

15. An engine nozzle assembly according to claim 14 wherein said supporting structure includes stop means to limit the swing of said enclosed ends of said wall members and thereby control the swinging movement of the exposed ends of said wall members to limit the size of the nozzle opening in the expanded and contracted condition.

* * * * *